United States Patent
Wang et al.

(10) Patent No.: US 6,866,883 B2
(45) Date of Patent: Mar. 15, 2005

(54) MECHANICAL TEXTURING OF SOL-GEL—COATED SUBSTRATES FOR MAGNETIC RECORDING MEDIA

(75) Inventors: Hong Ying Wang, Fremont, CA (US); Joseph Leigh, Campbell, CA (US); Neil Deeman, Alamo, CA (US); David Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/843,365

(22) Filed: May 12, 2004

(65) Prior Publication Data

US 2004/0209048 A1 Oct. 21, 2004

Related U.S. Application Data

(62) Division of application No. 09/852,268, filed on May 10, 2001, now Pat. No. 6,746,754.
(60) Provisional application No. 60/239,302, filed on Oct. 10, 2000, and provisional application No. 60/221,460, filed on Jul. 25, 2000.

(51) Int. Cl.$^7$ .............................................. B29D 17/00
(52) U.S. Cl. ..................... 427/129; 427/131; 427/240; 427/264; 427/266; 427/269; 427/271; 427/283; 427/287; 427/330; 427/355; 427/376.2; 427/387; 427/397.7
(58) Field of Search .............................. 427/129, 131, 427/240, 264, 266, 269, 271, 283, 287, 330, 355, 376.2, 387, 397.7

(56) References Cited

U.S. PATENT DOCUMENTS

| | | |
|---|---|---|
| 2,799,693 A | 7/1957 | Dodgson |
| 4,254,189 A | 3/1981 | Fisher |
| 4,808,463 A | 2/1989 | Yoshikatsu et al. |
| 4,950,548 A | 8/1990 | Furusawa et al. |
| 5,055,359 A | 10/1991 | Tsuno et al. |
| 5,080,948 A | 1/1992 | Morita et al. |
| 5,182,143 A | 1/1993 | Holmes-Farley et al. |
| 5,316,844 A | 5/1994 | Suzuki et al. |
| 5,328,645 A | 7/1994 | Lin et al. |
| 5,558,946 A | 9/1996 | Nishimoto |
| 5,599,580 A | 2/1997 | Futamoto et al. |
| 5,605,733 A | 2/1997 | Ishikawa et al. |
| 5,681,635 A | 10/1997 | Nelson et al. |
| 5,723,033 A | 3/1998 | Weiss |
| 5,738,906 A | 4/1998 | Momose et al. |
| 5,750,230 A | 5/1998 | Ishikawa et al. |
| 5,914,151 A | 6/1999 | Usuki |
| 5,958,544 A | 9/1999 | Usuki |
| 6,017,389 A | 1/2000 | Schmidt et al. |
| 6,165,583 A | 12/2000 | Boszormenyi |
| 6,197,399 B1 | 3/2001 | Naito et al. |
| 6,337,117 B1 | 1/2002 | Maenosono et al. |
| 6,497,925 B1 * | 12/2002 | Chen et al. .................. 427/515 |
| 6,623,788 B1 * | 9/2003 | Wang et al. ................. 427/130 |

* cited by examiner

*Primary Examiner*—Stevan A. Resan
(74) *Attorney, Agent, or Firm*—McDermott Will & Emery LLP

(57) ABSTRACT

A method of manufacturing a magnetic recording medium comprises steps of providing a non-magnetic substrate having at least one surface; forming a layer of a sol-gel on the surface, partially drying the sol-gel layer at room temperature to remove a portion of the solvent therein to form a partially dried sol-gel layer of hardness less than that of the substrate; mechanically texturing the surface of the partially dried sol-gel layer; and depositing a layer stack including at least one magnetic layer thereover. Embodiments of the invention include embossing a servo pattern in the as-deposited sol-gel layer prior to partial drying and mechanically texturing, followed by sintering at an elevated temperature to form a substantially fully dried layer having a density and hardness similar to that of glass, and formation of a thin film magnetic media layer stack thereon.

13 Claims, 3 Drawing Sheets

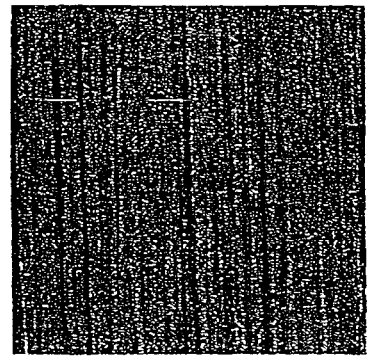
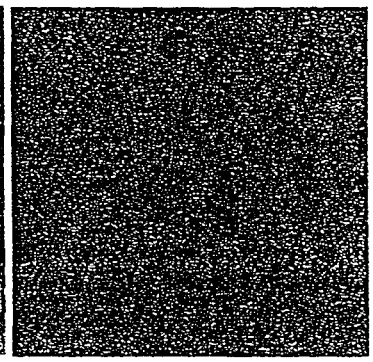
FIG. 2(A)   FIG. 2(B)
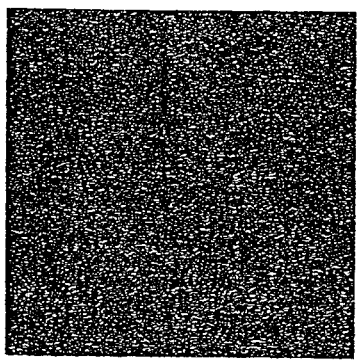
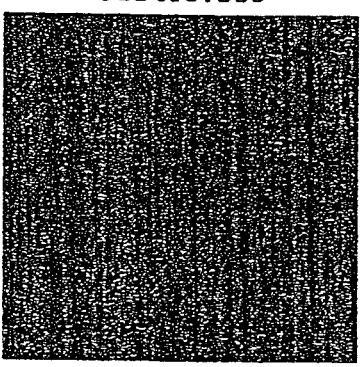
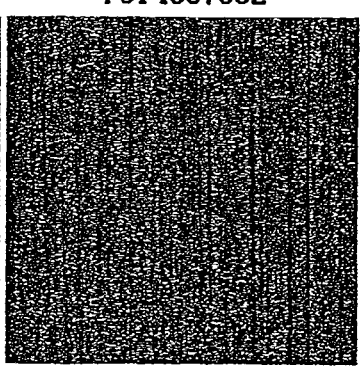
FIG. 3(A)   FIG. 3(B)   FIG. 3(C)

MECHANICAL TEXTURING OF SOL-GEL—COATED SUBSTRATES FOR MAGNETIC RECORDING MEDIA

CROSS-REFERENCE TO PROVISIONAL APPLICATIONS

This application is a divisional of application Ser. No. 09/852,268 filed May 10, 2001 now U.S. Pat. No. 6,746,754. Priority of U.S. Provisional Patent Application Ser. Nos. 60/221,460 and 60/239,302 filed on Jul. 25, 2000 and Oct. 10, 2000, is claimed under 35 USC 119.

FIELD OF THE INVENTION

The present invention relates to methods for forming mechanically textured substrates for magnetic recording media utilized in high areal density recording applications, and to magnetic recording media produced thereby. The invention has particular utility in the manufacture of magnetic data/information storage and retrieval media, e.g., hard disks, utilizing very hard-surfaced, high modulus substrates, such as of glass, ceramic, and glass-ceramic materials.

BACKGROUND OF THE INVENTION

Magnetic recording media are widely used in various applications, particularly in the computer industry. A portion of a conventional recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head as close to the associated recording surface as is possible, i.e., to minimize the "flying height" of the head. Thus, a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

Meanwhile, the continuing trend toward manufacture of very high areal density magnetic recording media at reduced cost provides impetus for the development of lower cost materials, e.g., polymers, glasses, ceramics, and glass-ceramics composites as replacements for the conventional Al alloy-based substrates for magnetic disk media. However, poor mechanical and tribological performance, track mis-registration ("TMR"), and poor flyability have been particularly problematic in the case of polymer-based substrates fabricated as to essentially copy or mimic conventional hard disk design features and criteria. On the other hand, glass, ceramic, or glass-ceramic materials are attractive candidates for use as substrates for very high areal density disk recording media because of the requirements for high performance of the anisotropic thin film media and high modulus of the substrate. However, the extreme difficulties encountered with grinding and lapping of glass, ceramic, and glass-ceramic composite materials have limited their use to only higher cost applications, such as mobile disk drives for "notebook"-type computers.

As employed herein, the term "glass" is taken to include, in the broadest sense, non-crystalline silicates, aluminosilicates, borosilicates, boroaluminosilicates, as well as polycrystalline silicates, aluminosilicates, and oxide materials; the term "ceramic" is taken to include materials consisting of crystalline particles bonded together either with a glass (i.e., vitreous) matrix or via fusion of the particles at their grain boundaries, as by sintering, as well as refractory nitrides, carbides, and borides when prepared in the form of bodies, as by sintering with or without a glass matrix or a silicon- or boron-containing matrix material, e.g., silicon nitride ($Si_3N_4$), silicon carbide (SiC), and boron carbide ($B_4C$); and the term "glass-ceramics" is taken to include those materials which are melted and fabricated as true glasses, and then converted to a partly crystalline state, such materials being mechanically stronger, tougher, and harder than the parent glass, as well as non-porous and finer-grained than conventional polycrystalline materials.

Presently, media anisotropy for obtaining high performance magnetic recording media is typically achieved by circumferentially polishing ("mechanically texturing") Al alloy substrates with NiP plating layers thereon by using a diamond or other relatively hard abrasive in slurry form dispensed on an absorbent and compliant polishing pad or tape. The circumferential texture pattern, produced by holding the surface of a rotating disk substrate against the polishing pad or tape with the abrasive slurry therebetween, simultaneously fulfills two desirable purposes: (1) tribologically—by minimizing stiction and friction at the head-disk interface; and (2) enhancing magnetic anisotropy—by providing a preferred orientation of the subsequently deposited polycrystalline Cr underlayer 12 and Co-based magnetic layer 13 along the circumferential texture lines of the pattern, resulting in an in-plane circumferential vs. radial anisotropy which improves the read/write parameters (e.g., coercivity $H_c$, residual magnetic susceptibility $B_r$, coercive squareness S*, magnetic anisotropy $K_\mu$) of the Co-based magnetic alloy layer.

The aforementioned circumferential texturing is thus effective for improving wear resistance and read/write characteristics of thin-film magnetic recording media; however, the benefits of texturing vary greatly upon the microscopic contours of the texture surface. Specifically, in order to form a medium having uniform magnetic characteristics, the microscopic contours of the texture surface must be made uniform.

Sub-micron flyability (e.g., <0.5 $\mu$ inch) of the recording transducer or head over a patterned media surface and enhanced media anisotropy thus are basic and essential requirements for obtainment of very high areal density recording media. However, attempts to achieve the requisite surface topography (e.g., substantially uniform texture patterns of desired contour or depth) on glass, ceramic, or glass-ceramic composite substrates utilizing conventional slurry-based abrasive polishing techniques have been unsuccessful due to their extreme hardness (e.g., glass substrates have a Knoop hardness greater than about 760 kg/mm$^2$ compared with 550 kg/mm$^2$ for Al alloy substrates with NiP plating layers). In addition, the low flowability and extreme hardness of these substrate materials effectively preclude formation of texture patterns in the surfaces thereof by injection molding or stamping, as is possible with polymer-based substrates.

In view of the foregoing, there exists a need for improved methodology for providing substrates for magnetic recording media, e.g., disk-shaped substrates, constituted of very hard, high modulus materials, with at least one surface thereof having requisite topography for enabling operation with flying head read/write transducers/heads operating at very low flying heights and with a texture provided therein for enhancing media anisotropy, e.g., by mechanical texturing. More specifically, there exists a need for an improved methodology for texturing, i.e., unidirectional mechanical texturing, of a surface of a substrate for a magnetic recording medium, comprised of a glass, ceramic, or glass-ceramic composite material, for reducing head-disk stiction/friction and for enhancing media anisotropy. In addition, there exists a need for an improved, high areal density magnetic recording medium including a high hardness, high modulus substrate having a textured surface for enhanced media anisotropy, e.g., a mechanically textured surface.

The present invention addresses and solves problems and difficulties attendant upon the use of very hard, high modulus materials, e.g., glasses, ceramics, and glass-ceramics, as substrate materials in the manufacture of very high areal density magnetic recording media, while maintaining fill capability with substantially all aspects of conventional automated manufacturing technology for the fabrication of thin-film magnetic media. Further, the methodology and means afforded by the present invention enjoy diverse utility in the manufacture of various other devices and media requiring formation of mechanically textured surfaces on high hardness materials.

DISCLOSURE OF THE INVENTION

An advantage of the present invention is an improved method of texturing a surface of a very hard, high modulus material for use as a substrate in the manufacture of thin film magnetic recording media.

Another advantage of the present invention is an improved method of mechanically texturing a surface of a high modulus substrate material for enhancing anisotropy of at least one magnetic layer formed thereover as part of a process for manufacturing high areal density magnetic recording media.

Still another advantage of the present invention is an improved method of mechanically texturing and embossing a servo pattern in a surface of a high modulus substrate material for use in magnetic recording media manufacture;

Yet another advantage of the present invention is an improved, high areal density magnetic recording media comprising a hard surfaced, high modulus, non-magnetic, non-metallic substrate.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium, comprising the sequential steps of:

(a) providing a non-magnetic substrate for a magnetic recording medium, the substrate including at least one major surface;

(b) forming a layer of a sol-gel on the at least one major surface of the substrate, the layer of said sol-gel including at least one solvent therein;

(c) removing a portion of the at least one solvent from the layer of the sol-gel to form a partially dried sol-gel layer, the partially dried sol-gel layer having an exposed surface with a hardness less than that of the at least one major surface of the substrate; and (d) providing the exposed surface of the partially dried sol-gel layer with texturing for enhancing anisotropy of at least one magnetic layer subsequently formed thereover.

According to embodiments of the present invention, step (a) comprises providing a disk-shaped, very hard, high modulus substrate having a pair of opposed major surfaces, the substrate being comprised of a glass, ceramic, or glass-ceramic composite material; step (b) comprises forming the layer of the sol-gel as a porous layer with the pores thereof saturated with the at least one solvent, e.g., by spin coating a solution of the sol-gel on the at least one major surface of the substrate; step (c) comprises partially drying the layer of the sol-gel at room temperature and atmospheric pressure for an interval sufficient to remove the portion of the solvent therefrom, i.e., for from about 12 to about 24 hours; and step (d) comprises mechanically texturing the exposed surface of the partially dried sol-gel layer, as by utilizing a slurry of abrasive particles dispensed on an absorbent and compliant polishing pad or tape, e.g., unidirectionally mechanically texturing the exposed surface of the partially dried sol-gel layer utilizing a slurry containing abrasive particles having a size of from about 0.1 to about 1 $\mu$m.

According to further embodiments of the present invention, the method comprises the further step of:

(e) sintering the partially dried sol-gel layer at an elevated temperature for a sufficient interval to form a substantially completely dried layer having an exposed surface with a density and hardness similar to that of glass, in which instance step (d) comprises providing the exposed surface of the partially dried sol-gel layer with texturing of a depth sufficient to compensate for partial loss of texture depth during subsequent step (e).

In accordance with still further embodiments of the present invention, step (b) further includes embossing a servo pattern in the exposed surface of the as-deposited sol-gel layer; and the method comprises the still further step (f) of forming a stack of thin film layers over the exposed surface of the substantially completely dried layer formed in step (e), the stack of layers including at least one ferromagnetic layer.

Another aspect of the present invention is a magnetic recording medium, comprising:

(a) a non-magnetic substrate having at least one major surface;

(b) a sol-gel-based or derived $SiO_2$-containing layer formed on the at least one major surface of said substrate, the $SiO_2$-containing layer including an upper surface having a unidirectionally oriented, mechanically textured pattern formed therein for enhancing anisotropy of at least one magnetic layer formed thereover; and (c) a stack of thin film layers formed over the upper surface of the sol-gel-based or derived $SiO_2$-containing layer, the stack of layers including at least one ferromagnetic layer.

According to embodiments of the present invention, the non-magnetic substrate (a) is disk-shaped with a pair of major surfaces, the substrate is comprised of a high modulus material selected from glasses, ceramics, and glass-ceramic composite materials; and the sol-gel-based or derived $SiO_2$ layer (b) is a partially dried sol-gel layer or a substantially fully dried, sintered layer having a density and hardness similar to that of glass.

In accordance with further embodiments of the present invention, the upper surface of the sol-gel-based or derived layer (b) additionally includes an embossed servo pattern; and the mechanically textured pattern comprises undulations varying from about −9 nm to about +18 nm.

Still another aspect of the present invention is a magnetic recording medium, comprising:

(a) a non-magnetic substrate having at least one surface, the non-magnetic substrate comprised of a high modulus material selected from glasses, ceramics, and glass-ceramics materials; and (b) sol-gel-based or derived means for enhancing anisotropy of at least one magnetic layer formed thereover.

According to embodiments of the present invention, the sol-gel-based or derived means comprises a partially dried or a sintered, substantially fully dried sol-gel layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, wherein:

FIGS. 2(A)–2(B) are respective Atomic Force Microscopy ("AFM") images of mechanically textured Al/NiP and sol-gel-coated substrates dried at a sintering temperature of about 200° C.;

FIGS. 3(A)–3(C) are respective AFM images of mechanically textured standard glass, Al/NiP, and sol-gel coated substrates dried at room temperature and atmospheric pressure;

DESCRIPTION OF THE INVENTION

Figure 1:
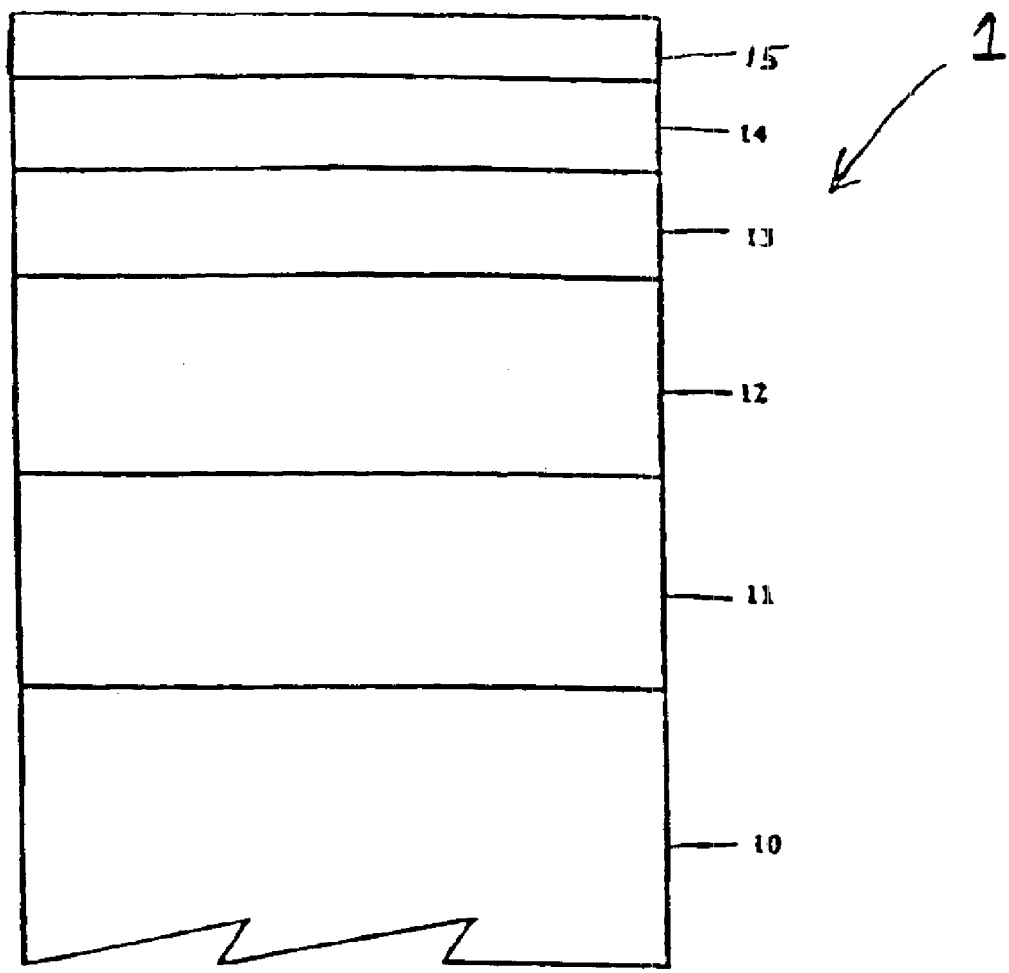
FIG. 1 illustrates, in schematic, simplified cross-sectional view, a portion of a thin film magnetic data/information recording/storage medium.

The present invention addresses and solves problems attendant upon the use of very hard-surfaced, high modulus materials, e.g., of glass, ceramics, and glass-ceramics, as alternatives to Al/NiP substrates in the manufacture of thin film, high areal density magnetic recording media, and is based upon the discovery by the present inventors that the surfaces of such materials can be modified, i.e., reduced in hardness, so as to facilitate the formation of unidirectional (e.g., circumferential) texture patterns therein, as by conventional methodology utilizing an absorbent polishing pad or tape and an abrasive slurry comprised of micron-sized abrasive particles. According to the invention, modification (i.e., reduction) of the surface hardness of very hard, high modulus alternative substrate materials to a level compatible with the requirements for unidirectional mechanical texturing by conventional polishing techniques utilizing an abrasive slurry, is obtained by first forming a relatively soft coating (i.e., layer) of a sol-gel on the substrate surface, removing a portion of the solvent(s) contained in the as-deposited sol-gel layer to form a partially dried sol-gel layer having a surface of predetermined hardness optimized for mechanical texturing, and then forming a unidirectionally oriented mechanical texture pattern in the surface of the partially dried sol-gel layer, as by use of conventional mechanical polishing methodologies and instrumentalities. A key feature of the present invention is the removal of only a portion of the solvent(s) contained in the as-deposited sol-gel layer by drying at ambient (i.e., room) temperature and atmospheric pressure to controllably volatilize the solvent(s) to obtain the partially dried sol-gel layer of desired (i.e., optimal) surface hardness for use in unidirectional mechanical texture processing of the surface of the partially dried sol-gel layer by means of conventional texturing utilizing an abrasive slurry. The thus-formed textured surface, partially dried sol-gel layer may then be subjected to thin film deposition for forming thereon a layer stack including at least one magnetic layer. Alternatively, the partially dried sol-gel layer with textured surface may be subjected to further drying for additional solvent removal and conversion into a glass layer prior to deposition of the layer stack thereon. According to still another variant of the present invention, the surface of the as-deposited sol-gel layer may be embossed with a servo pattern, followed in sequence by partial drying and unidirectional mechanical texturing of the sol-gel layer. The textured, partially dried sol-gel layer is then converted into to a substantially completely dried layer having a density and hardness similar to that of glass, and thin film deposition of the layer stack constituting the magnetic recording medium performed on the completely dried layer. In any case where the textured, partially dried sol-gel layer is subsequently substantially completely dried, as by sintering at an elevated temperature, to form a glass layer, the depth of the mechanical texturing is increased sufficient to compensate for any loss of texture depth resulting from the sintering process.

The inventive methodology thus advantageously provides high areal density magnetic recording media utilizing alternative, very hard-surfaced, high modulus, unidirectionally textured substrate materials, by use of conventional mechanical texturing techniques and without requiring writing of servo patterns subsequent to media fabrication.

More specifically, according to the present invention, a relatively soft layer of a sol-gel is initially formed on the hard-surfaced, high modulus glass, ceramic, or glass-ceramic composite substrate, e.g., in disk form. By way of illustration, but not limitation, a sol-gel layer having a thickness of from about 0.2 to about 1 $\mu$m may be formed on the substrate surface by any convenient technique, e.g., spin coating of a solution of the sol-gel. As an example, a suitable sol-gel solution for use according to the invention may be prepared by mixing an alkoxide, such as a silicon alkoxide, e.g., tetraethoxysilane ("TEOS") or tetramethoxysilane ("TMOS"), water, and nitric acid at molar ratios of TEOS or TMOS/$H_2O$/$HNO_3$ of 1/5/0.05. The nitric acid acts as a catalyst for conversion of the TEOS to a $SiO_2$ sol according to the following, which illustrates the reaction with TEOS:

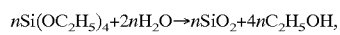

$$nSi(OC_2H_5)_4 + 2nH_2O \rightarrow nSiO_2 + 4nC_2H_5OH,$$

with ethanol ($C_2H_5OH$) being produced as a reaction product in solution. After completion of reaction, butanol ($C_4H_9OH$) is added to the solution as a drying retardation agent at molar ratios of TEOS/$H_2O$/$HNO_3$/$C_4H_9OH$ of 1/5/0.05/>4. Such solution, when applied to the substrate surface, as by spin coating, forms a very smooth film with a minimum amount of surface micro-waviness. The resultant film or layer is glass-like, principally comprised of silica ($SiO_2$) molecular clusters together with the various solvents ($H_2O$, $C_2H_5OH$, $C_4H_9OH$), and adheres well to the substrate surface. The sol-gel film or layer is of a porous structure with the solvents saturated in the micropores thereof.

Heat treatment of the as-deposited sol-gel films at different temperatures drives off different amounts of one or more of the entrapped solvents, resulting in the formation of films of variable hardness. Sintering at very high temperatures (i.e., >1000° C.) and for a sufficient interval results in complete evaporation of the solvent(s), causing the micropores to collapse, thereby densifying the film or layer into a glass-like material having a hardness and density similar to that of typical glass, i.e., 1.5 g/cm$^3$.

According to the inventive methodology, the as-deposited, relatively soft sol-gel film or layer applied to the hard-surfaced, high modulus substrate is not sintered at an elevated temperature (at least not initially), but rather is subjected to a treatment for removal therefrom of a portion of the solvent(s) contained in the micropores thereof, i.e., $H_2O$, $C_2H_5OH$, and/or $C_4H_9OH$, to form a partially dried sol-gel layer of hardness greater than that of the as-deposited, fully solvated sol-gel layer but less than that of the underlying substrate material, so as to facilitate unidirectional mechanical texturing thereof according to conventional practices, i.e., by utilizing an absorbent pad or tape and an abrasive particle-containing slurry. Treatment of the as-deposited sol-gel layer to remove therefrom a portion of the entrapped solvent(s) sufficient to yield a partially dried sol-gel layer of requisite hardness may, for example, be effected by drying at ambient (i.e., room) temperature and atmospheric pressure for from about 12 to about 24 hours.

More concretely, in making the present invention, the inventors performed a series of experiments for determining the optimal conditions for partial drying of the as-deposited, fully solvated sol-gel film. In a first set of experiments, sol-gel films prepared as described above were subjected to solvent removal by drying (i.e., sintering) at elevated temperatures ranging from about 125 to about 500° C. for intervals ranging from about 30 min. to about 2 hrs., to form coated substrates having an average surface roughness Ra (i.e., original roughness) of about 0.25 nm, which coated substrates were then subjected to mechanical texturing by means of a conventional Al/NiP substrate mechanical texturing process utilizing an abrasive slurry with 0.25 μm abrasive particles. FIGS. 2(A) and 2(B), respectively, show the Atomic Force Microscopy ("AFM") images of an Al/NiP disk substrate and a sol-gel-coated, high modulus, alternative substrate sintered at 200° C. for about 1 hr. after being subjected to identical texturing conditions utilizing an abrasive particle size of about 0.25 μm. As is evident from the AFM images, the Al/NiP disk shows clear directional polishing, whereas no significant change in surface roughness or texture is observed with the sol-gel-coated substrate (i.e., only a slight change in surface topography is evident), indicating that the sintered sol-gel film is much harder than the NiP surface.

A similar series of experiments were then performed with sol-gel-coated substrates prepared as described above, where the sol-gel layer was not sintered at an elevated temperature, but dried at ambient (i.e., room) temperature and pressure for intervals ranging from about 12 to about 24 hrs. in order to remove only a portion of the solvent(s) entrapped therein, e.g., for more than 12 hrs. Mechanical texturing of the surfaces of unsintered, partially dried sol-gel layers was then performed under conditions identical to those utilized above with the sintered sol-gel layers. The post-texturing AFM images shown in FIGS. 3(A), 3(B), and 3(C), respectively, for uncoated glass, Al/NiP, and partially dried sol-gel-coated glass substrates, indicate that the partially dried sol-gel-coated substrate of FIG. 3(C) exhibits: (1) improved unidirectional texturing vis-a-vis the fully dried (i.e., sintered) sol-gel coated substrate of FIG. 2(B); (2) significantly more orientation than that exhibited by the uncoated substrate of FIG. 3(A); and (3) slightly smaller texture undulations than those obtained with the Al/NiP substrate of FIG. 3(B).

Figure 4:
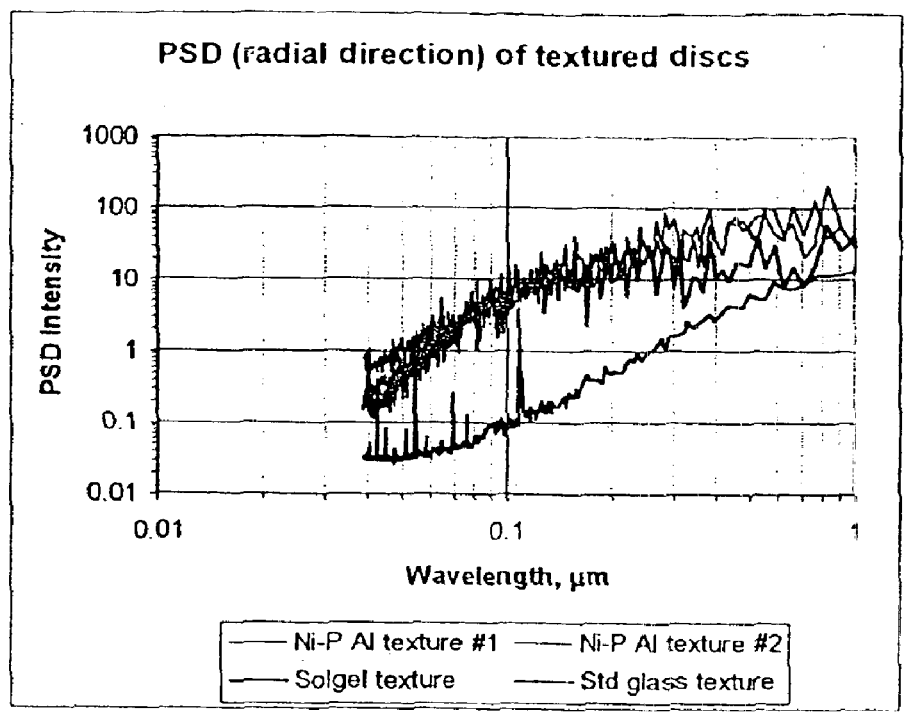
FIG. 4 is a graph showing the radial power spectra of the AFM images for each of the substrates of FIG. 3.

The graphs of FIG. 4 showing the corresponding radial power spectra of the AFM images of FIGS. 3(A)–3(C) confirm these observations in that the radial power spectra of the Al/NiP and partially dried sol-gel-coated substrates provide a significantly higher signal intensity than that provided by the uncoated glass substrate, wherein the considerable overlap of the spectra obtained for the two Al/NiP substrates evaluated indicates the repeatability of the texturing process and AFM/radial power spectrum analysis.

The hardness of the substrate material is a key factor in disk texturing by mechanical polishing utilizing an abrasive slurry, and the above-described experiments clearly establish that the hardness of the partially dried sol-gel coating layer is considerably less than that of standard glass substrates, but not necessarily less than that of the Al/NiP substrates, in view of the radial power spectra of the AFM images of the latter, which indicate that somewhat deeper texture undulations are obtained with 0.25 μm abrasive particles than with the partially dried, sol-gel-coated substrates.

Figure 5:
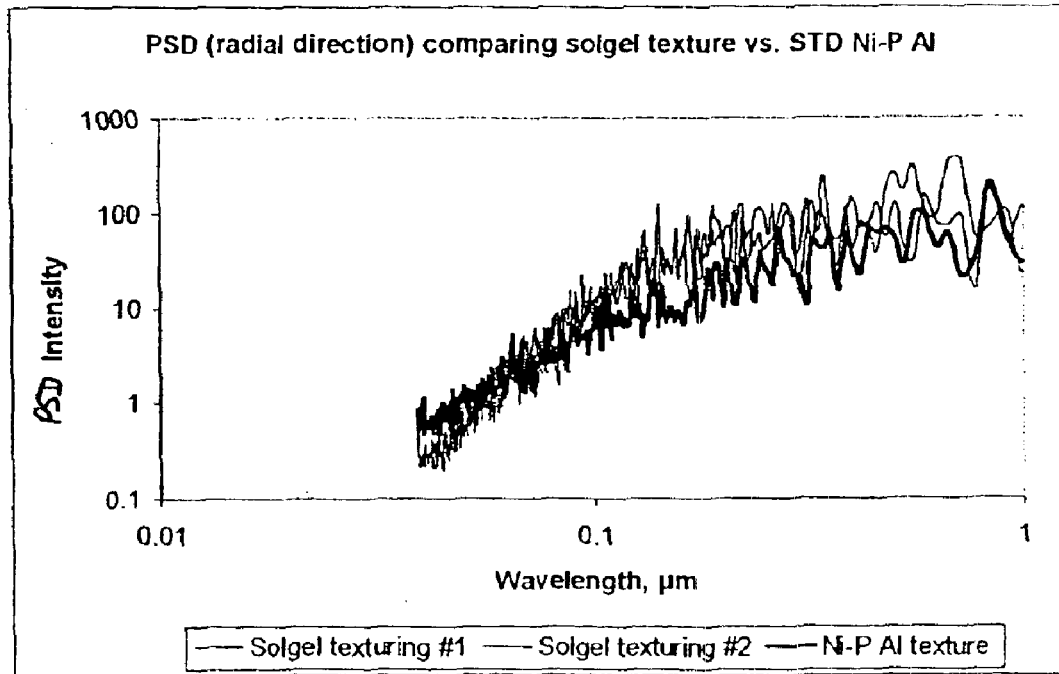
FIG. 5 is a graph showing the radial power spectra of AFM images of Al/NiP and sol-gel substrates with mechanical texturing obtained by polishing with a larger abrasive size than utilized with the substrates of FIG. 3.

However, texturing of partially dried sol-gel coating layers can be improved, as by use of larger abrasive particle size and a more uniform micro-fiber polishing tape, to form unidirectional, mechanically textured surfaces comparable to those obtained with Al/NiP, as evidenced by the similarity of radial power spectra of corresponding AFM images of textured, partially dried, sol-gel-coated and Al/NiP substrates shown in FIG. 5. Magnetic films sputtered on such textured, partially dried, sol-gel-coated substrates have exhibited orientation ratios of magnetic remanence (Mr) of as high as 1.29.

As indicated above, a stack of thin film layers (see, e.g., FIG. 1) constituting the magnetic recording medium may be formed on the mechanically textured, partially dried sol-gel layer, as by conventional techniques such as sputtering, or the as-deposited sol-gel layer may receive a servo pattern, e.g., by embossing, prior to partial solvent removal and mechanical texturing. The remaining solvent(s) in the partially dried sol-gel layer are subsequently driven off by sintering treatment at an elevated temperature so as to convert the latter into a substantially completely dried layer having a density and hardness similar to that of conventional glass, i.e., about 1.5 g/cm$^3$. Deposition of the thin film layer stack constituting the magnetic recording medium is then performed on the completely dried layer to yield a high performance, servo-patterned, high areal density magnetic recording medium suitable for use in, e.g., disk drive systems.

Thus, the present invention advantageously provides, as by processing techniques and methodologies which can be reliably practiced at low cost, improved, unidirectionally mechanically textured substrates comprised of high hardness, high modulus materials suitable for the manufacture of high areal recording density magnetic recording media, as well magnetic recording media including such improved, mechanically textured substrates. In addition, the present invention advantageously provides for simple and reliable fabrication of substrates with integrally formed servo patterns, without requiring costly, time-consuming servo-patterning subsequent to media fabrication.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:
1. A method of manufacturing a magnetic recording medium, comprising the sequential steps of:
(a) providing a non-magnetic substrate for a magnetic recording medium, said substrate including at least one major surface;
(b) forming a layer of a sol-gel on said at least one major surface of said substrate, said layer of said sol-gel including at least one solvent therein and having an exposed surface;
(c) removing a portion of said at least one solvent from said layer of said sol-gel to form a partially dried sol-gel layer, said exposed surface of said partially dried sol-gel layer having a hardness less than that of said at least one major surface of said substrate; and (d) providing said exposed surface of said partially dried sol-gel layer with texturing for enhancing anisotropy of at least one magnetic layer subsequently formed thereover.

2. The method according to claim 1, wherein:

step (a) comprises providing a disk-shaped, high modulus substrate having a pair of opposed major surfaces, said substrate being comprised of a glass, ceramic, or glass-ceramic composite material.

3. The method according to claim 1, wherein:

step (b) comprises forming said layer of said sol-gel as a porous layer with the pores thereof saturated with said at least one solvent.

4. The method according to claim 3, wherein:

step (b) comprises forming said layer of said sol-gel by spin coating a solution of said sol-gel on said at least one major surface of said substrate.

5. The method according to claim 1, wherein:

step (c) comprises partially drying said layer of said sol-gel at room temperature and atmospheric pressure for an interval sufficient to remove said portion of said solvent therefrom.

6. The method according to claim 5, wherein:

step (c) comprises drying said layer of said sol-gel at room temperature and atmospheric pressure for from about 12 to about 24 hours.

7. The method according to claim 1, wherein:

step (d) comprises mechanically texturing said exposed surface of said partially dried sol-gel layer.

8. The method according to claim 7, wherein:

step (d) comprises mechanically texturing said exposed surface of said partially dried sol-gel layer utilizing a slurry of abrasive particles dispensed on an absorbent and compliant polishing pad or tape.

9. The method according to claim 8, wherein:

step (d) comprises unidirectionally mechanically texturing said exposed surface of said partially dried sol-gel layer utilizing a slurry containing abrasive particles having a size of from about 0.1 to about 1 $\mu$m.

10. The method according to claim 1, further comprising the step of:

(e) sintering said partially dried sol-gel layer at an elevated temperature for a sufficient interval to form a substantially completely dried glass layer having an exposed surface with a density and hardness similar to that of glass.

11. The method according to claim 10, wherein:

step (d) comprises providing said exposed surface of said partially dried sol-gel layer with texturing of a depth sufficient to compensate for partial loss of texture depth during subsequent step (e).

12. The method according to claim 10, further comprising the step of:

(f) forming a stack of thin film layers over said exposed surface of said substantially completely dried glass layer formed in step (e), said stack of layers including at least one ferromagnetic layer.

13. The method according to claim 12, wherein:

step (b) further includes embossing a servo pattern in said exposed surface of said sol-gel layer.

* * * * *